Sept. 13, 1932.   L. A. COLELLA   1,876,859
VEHICLE AND MECHANISM FOR PROPELLING THE SAME
Filed April 16, 1931   2 Sheets-Sheet 1
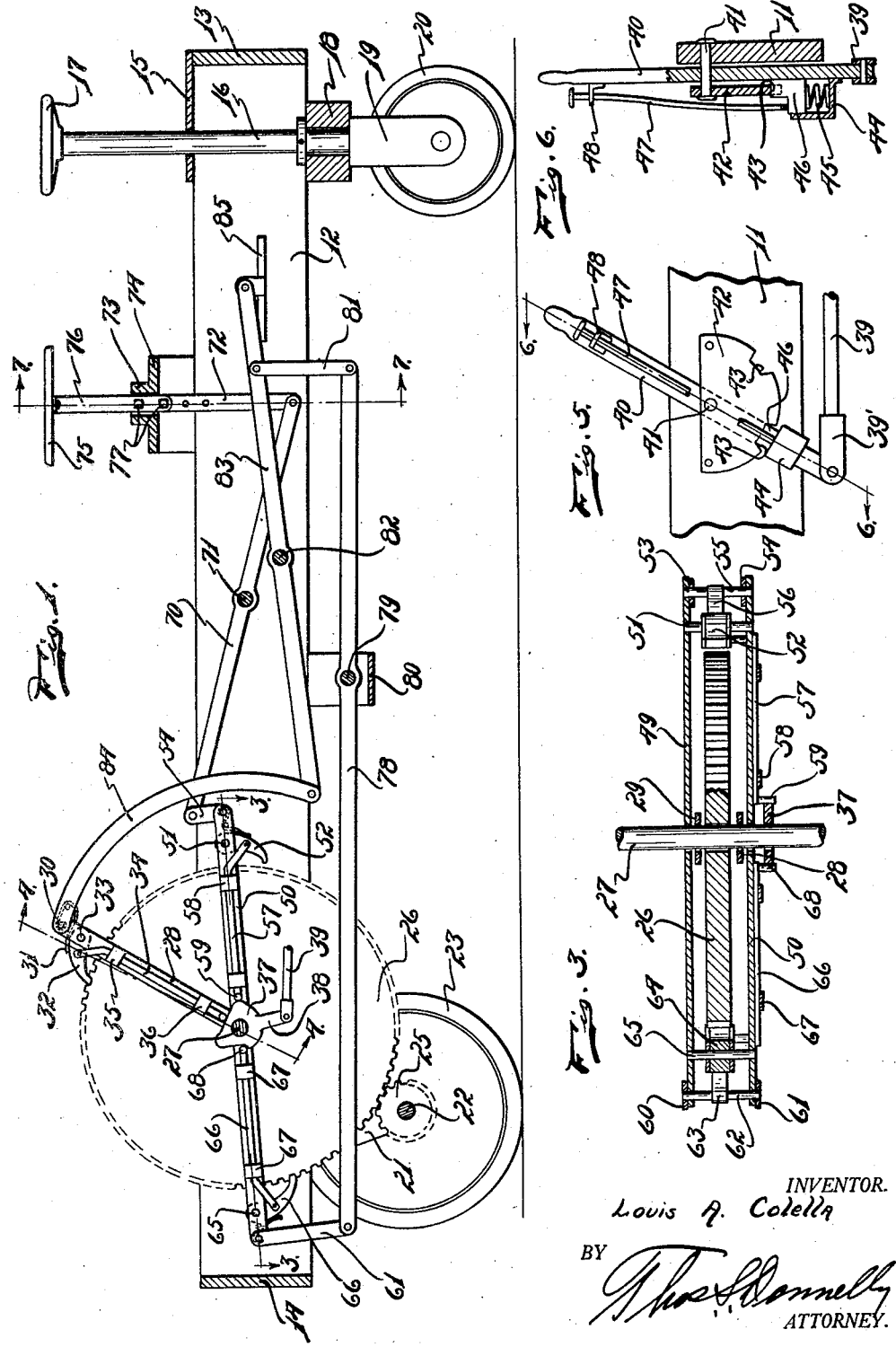
INVENTOR.
Louis A. Colella
BY
ATTORNEY.

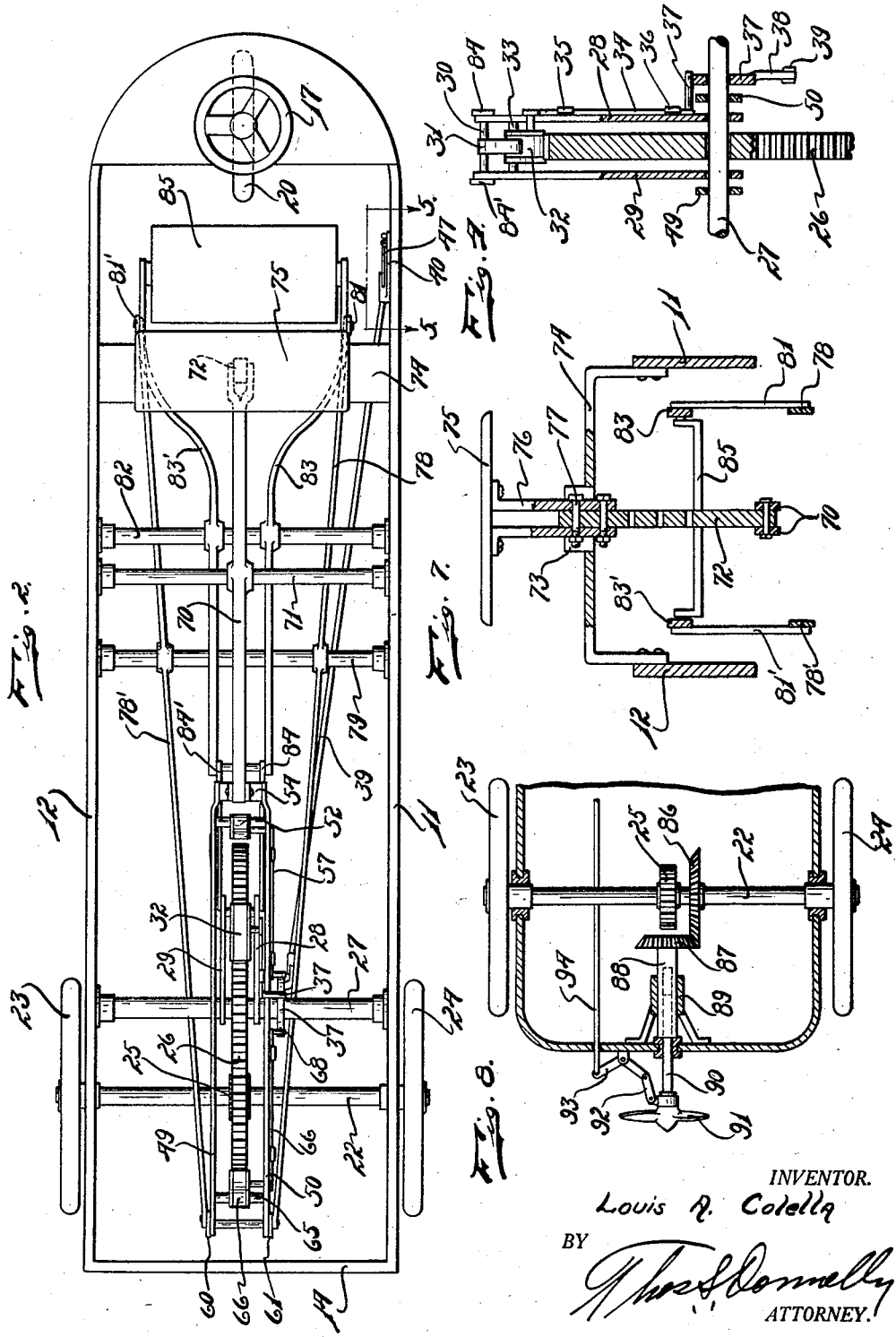

Patented Sept. 13, 1932

1,876,859

UNITED STATES PATENT OFFICE

LOUIS A. COLELLA, OF DETROIT, MICHIGAN, ASSIGNOR OF ONE-HALF TO MARIE SHELL, OF DETROIT, MICHIGAN

VEHICLE AND MECHANISM FOR PROPELLING THE SAME

Application filed April 16, 1931. Serial No. 530,575.

My invention relates to a new and useful improvement in a vehicle and mechanism for propelling the same, and has for its object the provision of a vehicle on which a child may ride and through operating the propelling mechanism serve to drive the vehicle either forwardly or rearwardly at will.

Another object of the invention is the provision in a vehicle of propelling mechanism which is foot operated and which co-operates with propelling mechanism operated by the seat on which the occupant of the vehicle rests.

Another object of the invention is the provision in a vehicle of this class of propelling mechanism which will be simple in structure economical of manufacture, durable, highly efficient in use, and easily operated.

Other objects will appear hereinafter.

The invention consists in the combination and arrangement of parts hereinafter described and claimed.

The invention will be best understood by a reference to the accompanying drawings, which form a part of this specification, and in which, Fig. 1 is a central, longitudinal, sectional view of the invention.

Fig. 2 is a top plan view of the invention.

Fig. 3 is a sectional view taken on line 3—3 of Fig. 1.

Fig. 4 is a sectional view taken on line 4—4 of Fig. 1.

Fig. 5 is a fragmentary, side elevational view, taken on line 5—5 of Fig. 2.

Fig. 6 is a sectional view taken on line 6—6 of Fig. 5.

Fig. 7 is a sectional view taken on line 7—7 of Fig. 1.

Fig. 8 is a fragmentary, sectional view illustrating a modification of the invention.

The invention comprises a frame or chassis consisting of the oppositely disposed side rails 11 and 12 having the cross bars 13 and 14 at the front and rear ends respectively. A platform 15 is supported on the forward end and projected through the platform, and journaled in a bolster 18 mounted on the frame is a steering post or standard 16 carrying a hand wheel 17 at its upper end and provided at its lower end with a fork 19 in which is rotatably mounted the front traction wheel 20. Depending from the frame adjacent the rear end is the bolster 21 in which is journaled the axle 22 on which are fixedly mounted the traction wheels 23 and 24. Fixedly mounted on the axle 22 preferably at the center thereof is a pinion 25 meshing with the large driving gear 26 which is rotatably mounted on the shaft 27 which is secured at its opposite ends to the side rails 11 and 12.

Rockably mounted on the shaft 27 at opposite sides of the driving gear 26 are arms 28 and 29 which are connected at their upper ends by the pin 30. Mounted on the pin 30 is a spring 31 normally engaging the pawl 32 which is swingably mounted on the pin 33, this pawl 32 being adapted for engaging the teeth of the driving gear 26. Attached to the pawl 32 intermediate its ends is a rod 34 which extends through the guide sleeves 35 and 36 mounted on the arm 28. The pin 37 projects outwardly from the lower end of the rod 34 so as to lie in engagement with the periphery of the cam plate 37 which is rotatably mounted on the shaft 27. Depending from this cam plate 37 is an arm 38 to which is connected one end of the operating rod 39, the opposite end of which connects to a fork 39' which is pivotally connected to the lower end of the operating lever 40. This lever 40 is rockably mounted by means of the pin 41 on the side rail 11. Mounted on this side rail 11 is a locking plate 42 having notches 43 formed in its edge and in which may engage the slidable locking block 46 which rides in the guide sleeve 44 mounted on the lever 40. A spring 45 serves to normally press the block 46 into engagement with the periphery of the blade 42 and into the notches 43 when brought into registration therewith. Slidably projected through a guide bracket 48 carried by the lever 40 is a rod 47 which is connected to the block 46.

Rockably mounted on the shaft 27 between their ends are bars 49 and 50. A pin 53 connects these bars at one end and serves as a support for a pawl 52 which is rockably mounted thereon and which is normally held in engagement with the gear 26 by the spring 56 which is mounted on the pin 55. A pair of spaced links 53 and 54 are secured at one of their ends to the pin 55. Connected at one end to the pawl 52 intermediate its ends is a rod 57 which is slidably projected through the guide sleeves 58 mounted on the outer surface of the bar 50. An outwardly projecting pin 59 is carried by the free end of the rod 57 and adapted to engage the periphery of the cam plate 37. A pin 62 serves to connect the opposite ends of the bars 49 and 50 and serves as a mounting for the spring 63 which engages the pawl 64 and serves to press the same into engagement with the periphery of the driving gear 26. This pawl 64 is pivotally mounted on the pins 65. Attached to the pawl 64 intermediate its ends is one end of a rod 66 which is slidably projected through the guide sleeves 67 carried by the bar 50. An outwardly projecting pin 68 is mounted on the free end of the rod 66 and engages the periphery of the cam plate 37. Link bars 60 and 61 are pivotally connected at one of their ends to the pin 62.

The links 53 and 54 are pivotally connected to one end of the beam 70 which is rockably mounted intermediate its ends on the shaft 71 which extends transversely of the frame and is mounted at its opposite ends on the side rails 11 and 12. Pivotally connected to the opposite end of the beam 70 and projecting upwardly therefrom is a support 72 which is provided with a plurality of openings and connected by the bolt 77 to the seat support extension 76 on the upper end of which is mounted the seat 75. A transversely extending plate 74 is mounted on the frame and provided with a guide neck 73 through which the members 72 and 76 are adapted to slide.

Connected at one end to the lower end of the link bars 60 and 61 are the beams 78 and 78' which are rockably mounted intermediate their ends on the transversely extending shaft 79 supported by the depending support 80 which is carried by the frame. Pivotally connected to and projecting upwardly from the opposite ends of the beams 78 and 78' are links 81 and 81' which are pivotally connected at their upper ends to the beams 83 and 83' which are rockably mounted intermediate their ends on the shaft 82. To the opposite ends of the beams 83 and 83' are pivotally connected at one of their ends the arcuate links 84 and 84', the other ends of which are connected to the upper ends of the bars 28 and 29. A pedal 85 is carried by the beams 83 and 83'.

In operation, the lever 40 may be moved to the position in which the pawls 32 and 66 will engage the periphery of the driving gear 26. When in this position, the cam plate 37 will be moved to a position so as to hold the pawl 52 out of engagement with the teeth of the driving gear 26. A rocking downwardly of the beams 83 and 83' through pressure directed onto the pedal 85 by the feet will effect a rotation of the driving gear 26. This will also effect an upward rocking of the beams 78 and 78' resulting in an upward movement of the seat 75 so that the operator of the vehicle may then release the pressure on the pedal 85 and through the downward pressure on the seat 75 rock the beam 70 downwardly to effect a reverse rocking movement of the beams 78 and 78' and the beams 83 and 83'. When the beams 83 and 83' are rocked upwardly at their rear ends, the pawl 32 will effect a rotation of the gear 26 and when the seat 75 is forced downwardly, the pawl 66 will serve to drive the gear 26. Thus there is provided a means for continuous driving of the gear 26 by the operator of the vehicle while in a position for controlling the steering post 16. This permits the propelling of the vehicle by the occupant and at the same time affords considerable exercise for the occupant.

Should it be desired to reverse the direction of propulsion, the lever 40 would be rocked on its mountings until the block 46 was engaged in the other slot in the plate 42. This would so rock the cam plate 37 as to move the pawls 32 and 66 to inoperative position and permit the pawl 52 to engage the periphery of the driving gear 26.

In Fig. 8 I have shown a slight modification of the invention in which the axle 22 is provided with a bevel gear 86 meshing with a bevel gear 87 which is carried by the shaft 88 journaled in the bearing 89. A shaft 90 is slidably projected into the shaft 88 and rotates in unison therewith. A screw propeller 91 is carried and rotated by the shaft 90 so that the vehicle may be propelled through water or on land as desired. When the vehicle is being propelled over the land, the screw propeller is moved into approach to the rear end of the vehicle by means of the link 92, the bell crank 93 and the rod 94 which may be extended to a position accessible to the occupant of the vehicle.

Having thus described my invention, what I claim as new and desire to secure by Letters Patent is:

1. A vehicle construction of the class described, comprising: a frame; traction wheels for supporting said frame; a rotatable gear adapted upon rotation for rotating said traction wheels; a bar rockably mounted intermediate its ends on the axis of said gear; a pair of dogs each rockably mounted on opposite ends of said bar and adapted when in operative position for engaging the periphery of said gear and rotating the same upon rocking of said bar; means for selectively moving either of said dogs to inoperative position; and rockable means for rocking said bar.

2. A vehicle construction of the class described, comprising: a frame; traction wheels for supporting said frame; a rotatable gear adapted upon rotation for rotating said traction wheels; a bar rockably mounted intermediate its ends on the axis of said gear; a pair of dogs each rockably mounted on opposite ends of said bar and adapted when in operative position for engaging the periphery of said gear and rotating the same upon rocking of said bar; means for selectively moving either of said dogs to inoperative position; rockable means for rocking said bar; an arm rockably mounted on the axis of said gear; a dog carried by the outer end of said arm; and means for moving said last mentioned dog and one of said first mentioned dogs to inoperative position simultaneously.

3. A vehicle construction of the class described, comprising: a frame; traction wheels for supporting said frame; a rotatable gear adapted upon rotation for rotating said traction wheels; a bar rockably mounted intermediate its ends on the axis of said gear; a pair of dogs each rockably mounted on opposite ends of said bar and adapted when in operative position for engaging the periphery of said gear and rotating the same upon rocking of said bar; means for selectively moving either of said dogs to inoperative position; rockable means for rocking said bar; an arm rockably mounted on the axis of said gear; a dog carried by the outer end of said arm; means for moving said last mentioned dog and one of said first mentioned dogs to inoperative position simultaneously; and rockable means for rocking said bar and said arm simultaneously.

4. A vehicle construction of the class described comprising: a frame; traction wheels for supporting said frame; a rotatable gear mounted on said frame and adapted upon rotation for rotating said traction wheels; a bar rockably mounted intermediate its ends on the axis of said gear; a pair of dogs each rockably mounted on opposite ends of said bar and adapted when in operative position for engaging the periphery of said gear and rotating the same upon rocking of said bar; a pair of rods each connected at one end to one of said dogs and projecting inwardly of said bar in alignment therewith, and terminating outwardly from the axis of rocking of said bar; a cam plate rockably mounted on the axis of said gear and engageable with its periphery on the inner ends of said rods, the rocking of said cam plate to one position rendering one of said dogs inoperative and the rocking of said cam plate to another position rendering the other of said dogs inoperative, said dogs being oppositely faced; and means for rocking said cam plate in either direction.

5. A vehicle construction of the class described comprising: a frame; traction wheels for supporting said frame; a rotatable gear mounted on said frame and adapted upon rotation for rotating said traction wheels; a bar rockably mounted intermediate its ends on the axis of said gear; a pair of dogs each rockably mounted on opposite ends of said bar and adapted when in operative position for engaging the periphery of said gear and rotating the same upon rocking of said bar; a pair of rods each connected at one end to one of said dogs and projecting inwardly of said bar in alignment therewith, and terminating outwardly from the axis of rocking of said bar; a cam plate rockably mounted on the axis of said gear and engageable with its periphery on the inner ends of said rods, the rocking of said cam plate to one position rendering one of said dogs inoperative and the rocking of said cam plate to another position rendering the other of said dogs inoperative, said dogs being oppositely faced; a means for rocking said cam plate in either direction; an arm rockably mounted at one end on the axis of said gear; means for rocking said arm in unison with the rocking of said bar; means for rocking said bar; a dog rockably mounted on the outer end of said arm; and means operable upon the rocking of said cam plate to one position for rendering said dog on said arm inoperative.

In testimony whereof I have signed the foregoing specification.

LOUIS A. COLELLA.